US005764274A

United States Patent [19]
Sousa et al.

[11] Patent Number: 5,764,274
[45] Date of Patent: Jun. 9, 1998

[54] APPARATUS FOR LASER-DISCHARGE IMAGING AND FOCUSING ELEMENTS FOR USE THEREWITH

[75] Inventors: John G. Sousa, Hudson; Richard A. Williams, Hampstead, both of N.H.; Mitchell C. Ruda, Tucson, Ariz.; Josh Foster, Nashua, N.H.

[73] Assignee: Presstek, Inc., Hudson, N.H.

[21] Appl. No.: 602,881

[22] Filed: Feb. 16, 1996

[51] Int. Cl.⁶ .................................................. B41J 2/385
[52] U.S. Cl. ............................................................ 347/258
[58] Field of Search ............................... 347/255, 256, 347/257, 258, 259

[56] References Cited

U.S. PATENT DOCUMENTS

| | | |
|---|---|---|
| 3,284,722 | 11/1966 | Gray . |
| 4,185,891 | 1/1980 | Gray . |
| 4,440,479 | 4/1984 | Khoe . |
| 4,530,574 | 7/1985 | Scifres et al. .................... 350/420 |
| 4,812,005 | 3/1989 | Heywang . |
| 4,865,409 | 9/1989 | Althaus et al. . |
| 4,890,289 | 12/1989 | Basu et al. . |
| 4,945,544 | 7/1990 | Tanaka et al. . |
| 4,979,791 | 12/1990 | Bowen et al. . |
| 5,080,706 | 1/1992 | Snyder et al. . |
| 5,081,639 | 1/1992 | Snyder et al. . |
| 5,155,631 | 10/1992 | Snyder et al. . |
| 5,165,345 | 11/1992 | Lewis et al. ....................... 101/453 |
| 5,196,866 | 3/1993 | Ferschl et al. . |
| 5,268,978 | 12/1993 | Po et al. ............................. 385/33 |
| 5,351,617 | 10/1994 | Williams et al. ................. 101/467 |
| 5,385,092 | 1/1995 | Lewis et al. ...................... 101/467 |
| 5,450,244 | 9/1995 | Fantone ............................ 359/710 |
| 5,540,150 | 7/1996 | Lewis et al. ...................... 101/467 |
| 5,546,487 | 8/1996 | Fantone ............................. 385/33 |

*Primary Examiner*—Edward Tso
*Attorney, Agent, or Firm*—Cesari & McKenna, LLP

[57] ABSTRACT

A focusing assembly includes features that allow numerical aperture to be reduced and optimized by reducing aberrations and ghost reflections and easily controlling stop size, thereby increasing depth-of-focus. The assembly includes a single, bi-aspheric focusing lens that optimizes image quality at a specific off-axis field point. Passage of excessively divergent radiation is prevented by a baffle having a sharp, flared edge that minimizes reflection. A second aperture or baffle can be included to restrict high-divergence radiation emerging from the bi-aspheric focusing lens. All interior surfaces of the focusing assembly are preferably blackened, once again to minimize internal reflections.

16 Claims, 5 Drawing Sheets

APPARATUS FOR LASER-DISCHARGE IMAGING AND FOCUSING ELEMENTS FOR USE THEREWITH

BACKGROUND OF THE INVENTION

1. Field of the Invention

The present invention relates to digital printing apparatus and methods, and more particularly to a system for imaging lithographic printing members on- or off-press using digitally controlled laser output.

2. Description of the Related Art

In offset lithography, a printable image is present on a printing member as a pattern of ink-accepting (oleophilic) and ink-repellent (oleophobic) surface areas. Once applied to these areas, ink can be efficiently transferred to a recording medium in the imagewise pattern with substantial fidelity. Dry printing systems utilize printing members whose ink-repellent portions are sufficiently phobic to ink as to permit its direct application. Ink applied uniformly to the printing member is transferred to the recording medium only in the imagewise pattern. Typically, the printing member first makes contact with a compliant intermediate surface called a blanket cylinder which, in turn, applies the image to the paper or other recording medium. In typical sheet-fed press systems, the recording medium is pinned to an impression cylinder, which brings it into contact with the blanket cylinder.

In a wet lithographic system, the non-image areas are hydrophilic, and the necessary ink-repellency is provided by an initial application of a dampening (or "fountain") solution to the plate prior to inking. The ink-abhesive fountain solution prevents ink from adhering to the non-image areas, but does not affect the oleophilic character of the image areas.

If a press is to print in more than one color, a separate printing member corresponding to each color is required. The original image is decomposed into a series of imagewise patterns, or "separations," that each reflect the contribution of the corresponding printable color. The positions of the printing members are coordinated so that the color components printed by the different members will be in register on the printed copies. Each printing member ordinarily is mounted on (or integral with) a "plate" cylinder, and the set of cylinders associated with a particular color on a press is usually referred to as a printing station.

In most conventional presses, the printing stations are arranged in a straight or "in-line" configuration. Each such station typically includes an impression cylinder, a blanket cylinder, a plate cylinder and the necessary ink (and, in wet systems, dampening) assemblies. The recording material is transferred among the print stations sequentially, each station applying a different ink color to the material to produce a composite multi-color image. Another configuration, described in U.S. Pat. No. 4,936,211, relies on a central impression cylinder that carries a sheet of recording material past each print station, eliminating the need for mechanical transfer of the medium to each print station. With either type of press, the recording medium can be supplied to the print stations in the form of cut sheets or a continuous "web" of material.

To circumvent the cumbersome photographic development, plate-mounting and plate-registration operations that typify traditional printing technologies, practitioners have developed electronic alternatives that store the imagewise pattern in digital form and impress the pattern directly onto the plate. Plate-imaging devices amenable to computer control include various forms of lasers. U.S. Pat. Nos. 5,351,617 and 5,385,092 disclose an ablative recording system that uses low-power laser discharges to remove, in an imagewise pattern, one or more layers of a lithographic printing blank, thereby creating a ready-to-ink printing member without the need for photographic development. In accordance with those systems, laser output is guided from the diode to the printing surface and focused onto that surface (or, desirably, onto the layer most susceptible to laser ablation, which will generally lie beneath the surface layer).

As discussed in the '617 and '092 patents, laser output can be generated remotely and brought to the printing blank by means of optical fibers and focusing lens assemblies. Alternatively, the laser diode itself can be positioned adjacent the printing member and its output provided directly thereto through a focusing assembly. While commercially suitable, these arrangements can be vulnerable to power loss. Laser diodes are constructed to emit radiation from an output slit, and the radiation disperses around the edges of the slit as it exits. This means that, in the case of fiber-optic systems, power can be lost where laser output is coupled into the fiber, along the fiber if it is bent beyond the critical angle of refraction, and at the output of the fiber, where emitted radiation can once again disperse. Even in direct-output systems, which avoid the use of optical fibers, loss of power can occur unless steps are taken to reduce the divergence of radiation exiting the diode.

The '617 patent discloses an output assembly for guiding laser radiation (taken directly from the laser itself, or from a fiber-optic cable) to the imaging surface. The assembly includes a generally tubular body defining a hollow channel, and containing two or more focusing lenses. The distance between the lenses and the source of laser radiation is chosen so the at normal working distance from a printing member, the beam will be precisely focused on the surface. This distance can be altered to vary the size of an image feature.

The '617 patent also discloses a mounting configuration that permits rotation in the axial direction to facilitate fine axial positioning adjustment. It was found that if the angle of rotation is kept to 4° or less, the circumferential error produced by the rotation can be corrected electronically by shifting the image data.

An improved focusing system that permits a greater degree of control over beam position is illustrated in FIG. 1. A fiber-optic cable 10 terminates in an SMA (or similar) connector package 12, which includes a threaded collar 14 that is free to rotate. The focusing assembly 16 includes a threaded sleeve 18 that mates with hood 14; a first tubular housing segment 20; and a second housing segment 22. Sleeve 18 is secured to segment 20 by a nut 24, and is located off-center with respect to segment 20. In other words, the central axis of sleeve 18 is radially shifted with respect to the central axis of segments 20, 22, which define a single continuous bore 30 with an inner wall 31. Segments 20 and 22 are free to rotate with respect to one another, but may be locked into a desired torsional orientation by a pair of nuts 26, 28. Segment 22 contains a pair of focusing lenses 32, 34 at its terminus.

Because sleeve 18 is located off-axis, the beam from cable 10 cannot pass through the center of bore 30; the beam axis always remains shifted with respect to the central axis of bore 30, and rotation of segments 20, 22 shifts the angular position the optical or beam axis. The reason for this construction is shown in FIG. 2. Assume that a perfectly mounted focusing assembly 16 would have a central axis that passes through the origin of the x,y axes. Such perfection is both expensive and difficult to achieve in practice. Thus, suppose that the central axis 40 of a representative focusing assembly 16 is displaced with respect to the origin as illustrated. Due to the eccentricity in mounting, the beam will be even more displaced, as shown at 42. However, relative rotation of segments 20, 22 conveniently brings the beam into horizontal alignment (i.e., intercepting the y-axis), and simple timing adjustments can ordinarily be used to compensate for the resulting vertical offset. For example, in a drum configuration, where the beam focuses onto the surface of a rotating printing member, resulting in relative movement along the y-axis, the effective origin can be shifted merely by advancing or delaying the moment of laser activation; if an image dot is to be written onto the origin, the laser controller waits for the true origin on the printing member to reach adjacency with the offset position of the beam before firing the laser.

While suitable for many applications, the foregoing design nonetheless exhibits certain design shortcomings. Refer to FIG. 3, which illustrates the manner in which even a perfectly centered laser beam emanating into bore 30 can diverge and strike the inner wall 31, producing ghost reflections of various diameters in the focal plane. (In fact, the figure illustrates only the primary reflections; higher-order reflections interfere with point focusing still further.) The eccentricity of the optical axis exacerbates this problem, since the outer rays strike wall 31 sooner, resulting in additional interactions. Indeed, since the beam dispersion must be sufficient to ensure adequate energy through the central axis despite off-axis emission, such reflections are largely unavoidable. Still further interactions can result from the reflection of the beam back into bore 30 and off the inner face of the rear wall of segment 20. The asymmetry of all these interactions results in shadowing and ghost reflections, the ultimate result of which is unwanted, spurious energy at the focal plane that causes, among other things, inaccurate power readings during alignment.

The conventional two-element lens arrangement illustrated in FIGS. 2 and 3 is designed primarily for, and performs optimally with, radiation sources optically centered on the bore axis. The aberrations of a point image, that image being located off of the optical axis, are not minimized in a conventional two-element design to produce the smallest image.

DESCRIPTION OF THE INVENTION

BRIEF SUMMARY OF THE INVENTION

The present invention utilizes at least one laser device that emits in the IR, and preferably near-IR region, to image ablative printing members as disclosed, for example, in the '617 and '092 patents, as well as in U.S. Pat. Nos. 5,339,737 and 5,379,698. The invention preferably utilizes solid-state lasers (commonly termed semiconductor lasers and typically based on gallium aluminum arsenide or gallium aluminum indium compounds) as sources; these are distinctly economical and convenient, and may be used in conjunction with a variety of imaging devices. The use of near-IR radiation facilitates use of a wide range of organic and inorganic absorption compounds and, in particular, semiconductive and conductive types.

In accordance with the invention, laser output is provided directly to a blank printing member via an arrangement that guides the emitted radiation, reduces its divergence and focuses it onto the plate surface. (In fact, the beam is preferably focused on the "ablation layer" designed to volatilize in response to laser radiation; however, the depth of focus of the laser beam provides a degree of tolerable deviation.) As used herein, the term "plate" or "member" refers to any type of printing member or surface capable of recording an image defined by regions exhibiting differential affinities for ink and/or fountain solution; suitable configurations include the traditional planar or curved lithographic plates that are mounted on the plate cylinder of a printing press, but can also include seamless cylinders (e.g., the roll surface of a plate cylinder), an endless belt, or other arrangement.

The focusing assembly of the present invention includes several features that improve over prior-art designs, reducing ghost reflections and other sources of stray light, increasing throughput, reducing aberrations and allowing for fine adjustment of numerical aperture so as to facilitate greater depth-of-focus. In a first aspect, the invention utilizes a single, anti-reflection coated, bi-aspheric focusing lens, having an external aperture stop, which corrects for image blur at the required off-axis field point. The diameter of the aperture stop is optimized to maximize depth-of-focus. In a preferred embodiment, the lens includes a baffle that blocks for out-of-numerical aperture emission of radiation. The single lens of the present invention reduces both material and assembly costs compared to the double-lens configuration shown in FIG. 1, as well as the ghost reflections created by four optical surfaces.

In a second aspect, the invention employs several expedients to obtain laser radiation having very low divergence and therefore high energy flux. At the output stage, the passage of excessively divergent radiation is prevented by a baffle having a sharp, flared edge that minimizes reflection. An aperture stop restricts radiation emerging from the bi-aspheric focusing lens; the stop is located externally to the lens and is preferably incorporated as part of the end cap. The cap is removable (at least prior to permanent installation), and the size of the aperture stop can be conveniently varied—e.g., to accommodate lasers of different power levels—by selecting among end caps having varying apertures. All interior surfaces of the focusing assembly are preferably blackened, once again to minimize internal reflections.

Measures are also taken at the manufacturing stage to couple only low-divergence radiation from the laser into a fiber-optic cable, which transmits the radiation to the output and focusing assembly. In particular, an aperture or baffle is utilized during the process of aligning the laser and the output end face of the fiber-optic cable so that the lowest-divergence radiation is detected, thereby ensuring maximum energy coupling into the fiber.

BRIEF DESCRIPTION OF THE DRAWINGS

The foregoing discussion will be understood more readily from the following detailed description of the invention, when taken in conjunction with the accompanying drawings, in which.

DETAILED DESCRIPTION OF THE PREFERRED EMBODIMENTS

1. Radiation Capture

As noted earlier, radiation can originate with a remotely sited laser and be transmitted, via a fiber-optic cable, to the focusing and output assembly. If the laser is to be remotely sited, its output must first be efficiently coupled into the end face of the cable.

Figure 4C:
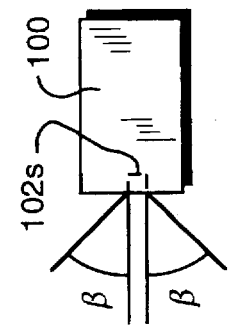
FIG. 4C is an elevation of the diode shown in FIG. 4A, showing the dispersion of radiation exiting therefrom along the other dimension.
Figure 4B:
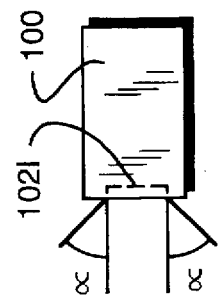
FIG. 4B is a plan view of the diode shown in FIG. 4A, showing the dispersion of radiation exiting therefrom along one dimension.
Figure 4A:
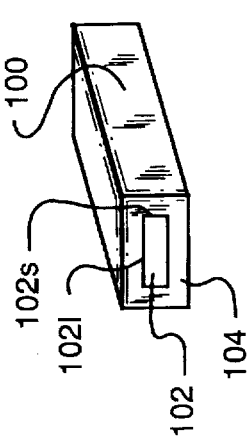
FIG. 4A is an isometric view of a typical laser diode.

FIG. 4A shows a common type of laser diode, in which radiation is emitted through a slit 102 in the diode face 104. The dimensions of slit 102 are specified along two axes, a long axis 102$l$ and a short axis 102$s$. Radiation disperses as it exits slit 102, diverging at the slit edges. This is shown in FIGS. 4B and 4C. The dispersion around the short edges (i.e., along long axis 102$l$), as depicted in FIG. 4B (where diode 100 is viewed in plan), is defined by an angle $\alpha$; the dispersion around the long edges (i.e., along short axis 102$s$), as depicted in FIG. 4C (where diode 100 is viewed in elevation), is defined by an angle $\beta$. The numerical aperture (NA) of slit 102 along either axis is defined as the sine of the dispersion angle $\alpha$ or $\beta$.

For optimum performance, $\alpha=\beta$ and the unitary NA is less than 0.3, and preferably less than 0.2. Small NA values correspond to large depths-of-focus, and therefore provide working tolerances that facilitate convenient focus of the radiation onto the end face of a fiber-optic cable. Without correction, however, these desirable conditions are usually impossible, even with special mask structures that have recently been applied to the multi-stripe and single-stripe semiconductor lasers useful in the present invention; laser diode 100 typically does not radiate at a constant angle, with divergence around the long edges exceeding that around the short edges, so $\beta>\alpha$.

Figure 5:
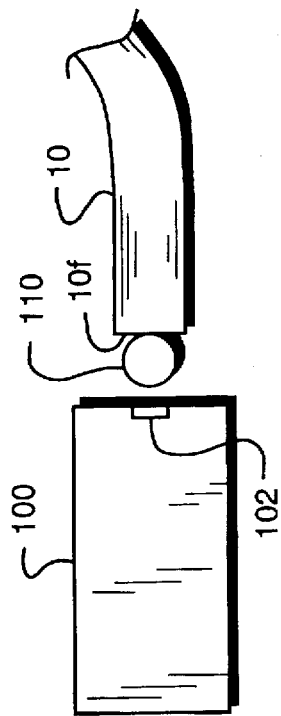
FIG. 5 is an elevational view of an arrangement for coupling the output of a laser diode into the end face of a fiber-optic cable.

Assuming that the NA along long axis 102$l$ falls within acceptable limits, the NA along the short axis 102$s$ can be made to approach the long-axis NA by controlling dispersion around the long edges. This is achieved using a divergence-reduction lens. One suitable configuration for such a lens is a cylinder 102 (essentially a glass rod segment of proper diameter), as shown in FIG. 5. Cylindrical lens 110, which has received an antireflection coating, is interposed directly between the emitter and a flat fiber face 10$f$, preferably in intimate contact with the fiber face and spaced slightly from the diode 100. Lens 110 reduces divergence around edges 102$l$ (i.e., $\beta$) and focuses the laser beam onto face 10$f$. If the NA around edges 102$s$ (i.e, $\alpha$) also exceeds acceptable limits, this dispersion can be diminished using a suitable condensing lens. It should be stressed that advantageous use of a divergence-reduction lens is not limited to slit-type emission apertures. Such lenses can be usefully applied to any asymmetrical emission aperture in order to ensure even dispersion around its perimeter.

Preferably, the divergence-reduction lens has an antireflection coating to prevent radiation from rebounding and interfering with operation of diode 100 (for example, by causing the condition known as "mode hopping"). A practical manufacturing approach utilizes a facet coater to place an antireflection coating on the glass rod intended to serve as a cylindrical divergence-reduction lens. The coating, preferably a multilayer broad-band coating such as magnesium fluoride over titanium, is applied first along one half of the circumference and then along the other half. Overlap of the two applications is preferable to an uncoated gap. Therefore, to prevent transmission losses, the coated lens is oriented with respect to slit 102$s$ such that radiation passes through lens regions have not been doubly coated; the opposed, doubly coated arc segments are positioned above and below the path of radiation emitted from diode 100. This positioning is straightforwardly obtained using known techniques of microscopic mechanical manipulation.

Figure 6B:
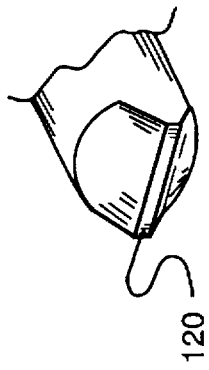
FIGS. 6A and 6B are side and end elevations of a chisel-edge end face of a fiber-optic cable.
Figure 6D:
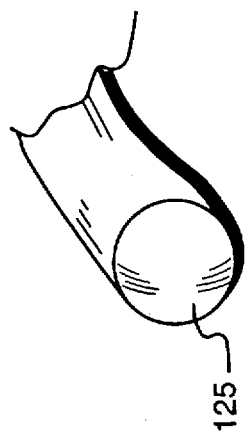
FIGS. 6C and 6D are side and end elevations of a hemispherical end face of a fiber-optic cable.
Figure 6A:
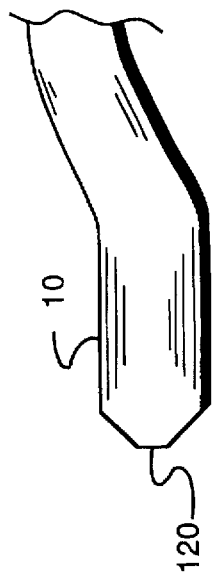
Figure 6C:
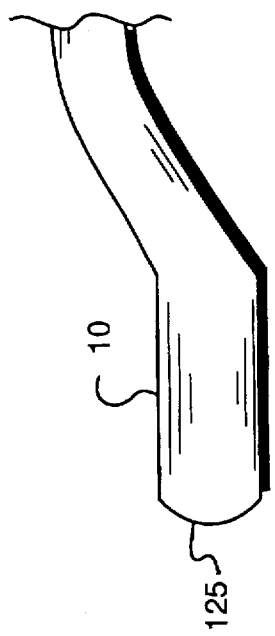

With the radiation emitted through slit 102 fully corrected as described above, it can be straightforwardly focused onto the end face of the fiber-optic cable 10. As shown in FIGS. 6A–6D, the face 10$f$ of fiber-optic cable 10 can also be shaped to contribute to optical coupling or even to replace lens 110 entirely. For example, face 10$f$ can be tapered by grinding into a flat chisel edge 120 that accepts beam radiation along a sufficiently narrow edge to avoid back reflection and consequent modal instability, as shown in FIGS. 6A and 6B. So long as the divergence of radiation emitted from slit 102 has been adequately reduced or controlled, the arrangement shown in FIGS. 6A and 6B will perform advantageously. In another embodiment, illustrated in FIGS. 6C and 6D, the face of fiber-optic cable 10 is rounded into a hemisphere 125, again functioning to accept incoming radiation without mode hopping.

In some arrangements, it may prove necessary or desirable to utilize a fiber with a flat face 10$f$ that is smaller in diameter than the length of diode's large axis. Unless the the radiation emitted along the long axis is concentrated optically, the loss of radiation that fails to impinge on end face 10$f$ must either be accepted or the end face distorted (e.g., into an ellipse) to more closely match the dimensions of slit 10$f$.

Alignment of slit 102 with fiber face 10$f$ represents a critical part of the manufacturing process, since capture of high-flux, low-NA light is critical to adequate depth-of-focus at the output stage. In practice, the minimum necessary depth-of-focus is based on mechanical adjustment and accuracy limitations; with this quantity and the necessary degree of beam demagnification at the output stage effectively fixed, output depth-of-focus is determined primarily by the NA value of the radiation emitted from the transmitting fiber face, which is itself governed by the numerical aperture of radiation coupled into the receiving face 10$f$. Proper alignment guarantees that the lowest-divergence radiation is coupled into fiber 10.

Our approach to alignment is to vary the position of fiber face 10$f$ (and, ordinarily, lens 110 as well) by manipulating fiber 10 (using microrobotic grippers or the like) with respect to slit 102 until a maximum power output is detected at the opposite face of fiber 10. Diode 100 is fixedly mounted within a cartridge before the alignment process and, when fiber face 10$f$ has reached the position of maximum power capture, fiber 10 is cemented or soldered or welded to a support. To enhance the alignment process, an aperture or baffle can be introduced at the opposite face of fiber 10 so that the power meter detects only low-NA radiation. In this way, the measurable output is restricted to high-flux radiation, which both reduces the region within which radiation can be detected and confines output signals to unmistakably high values, thereby simplifying the alignment process. Preferably, the aperture or baffle allows passage only of radiation having NA values no greater than 0.060.

2. Radiation Focusing and Emission

Figure 7:
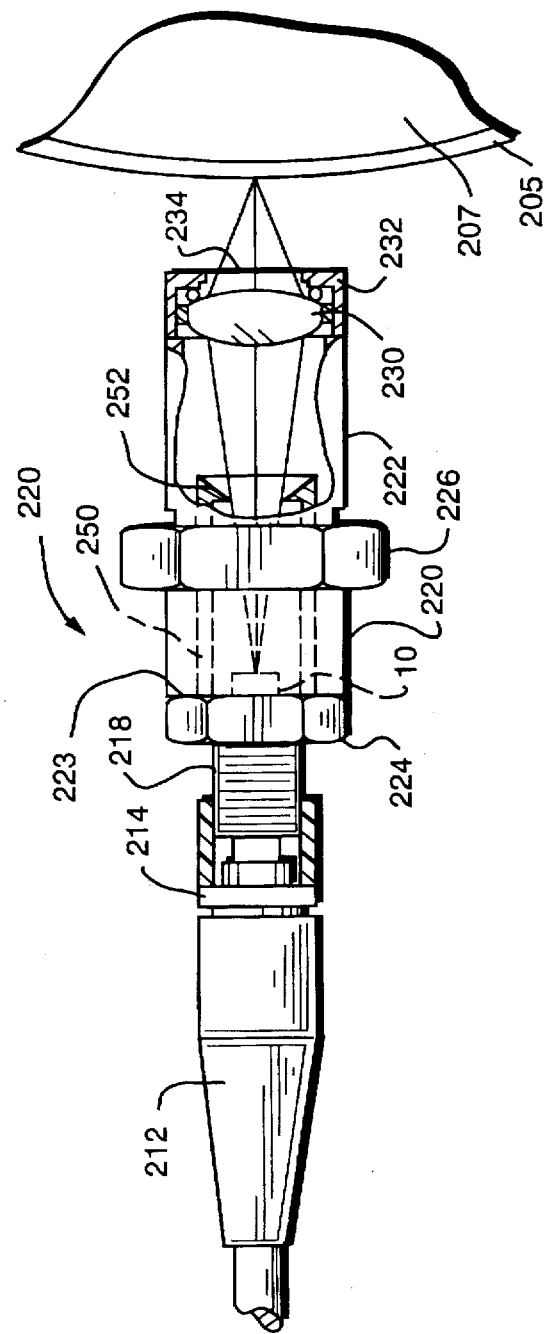
FIG. 7 is a partial cutaway elevation of a focusing arrangement in accordance with the present invention.

Refer now to FIG. 7, which illustrates an output assembly 200 in accordance with the present invention. Assembly 200 guides radiation from fiber-optic cable 10 to the imaging surface of a printing member 205, which is itself supported on a rotatable drum or plate cylinder 207. (Numerous alternatives to this configuration are possible. For example, printing member 205 can constitute the exterior surface of drum 207, or, as noted in the '617 patent, printing member 207 can be supported on the interior of a curved platen, or on a flatbed arrangement.)

Figure 1:
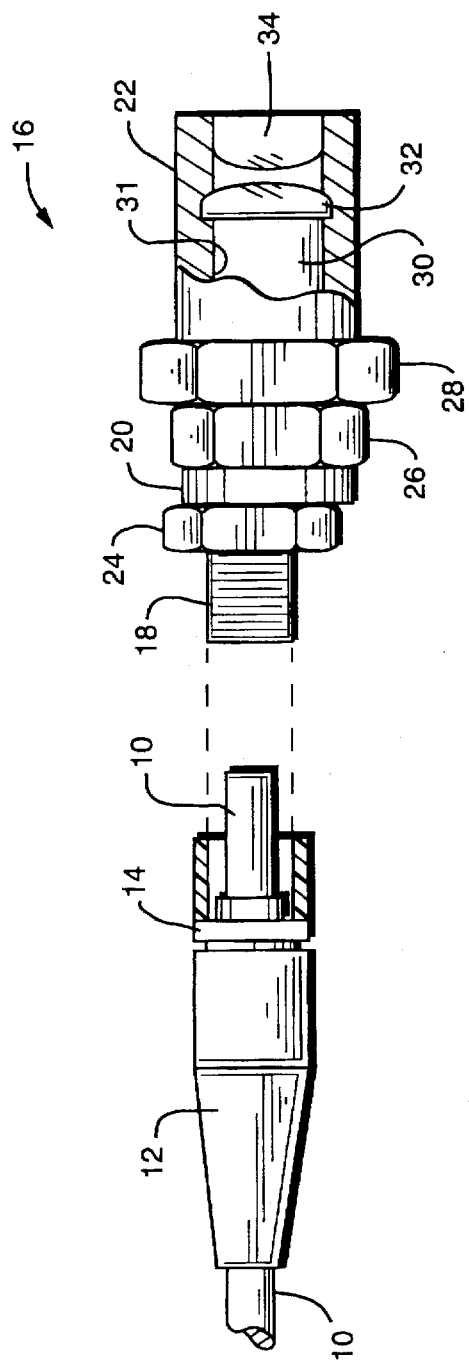
FIG. 1 is a partial cutaway elevation of a prior-art focusing device.
Figure 2:
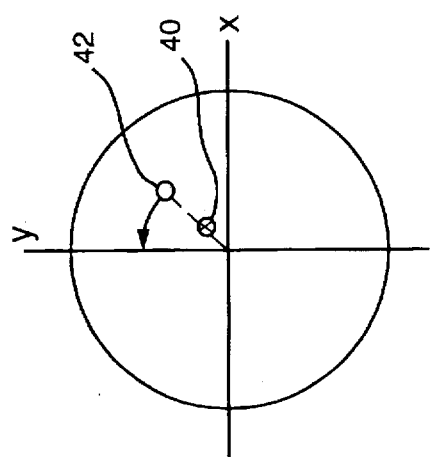
FIG. 2 schematic depicts correction of beam displacement from a true position.
Figure 3:
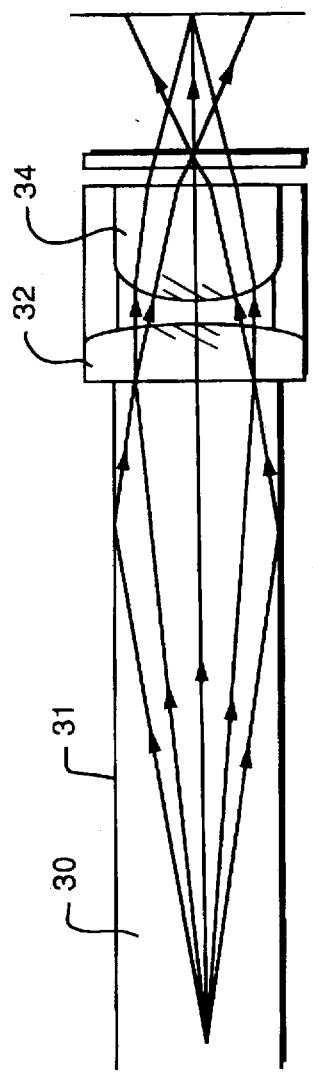
FIG. 3 illustrates primary reflections that result when the device shown in FIG. 1 is used.

As shown in the figure, fiber-optic cable 10 terminates in an SMA connector assembly 212 which, once again, includes a threaded collar 214 that mates with a sleeve 218 on the assembly 200. In addition to sleeve 218, focusing assembly 200 includes first and second tubular housing segments 220, 222. Sleeve 218 is secured to the end wall 223 of segment 220 by a nut 224, and is preferably located off-center with respect to segment 220 (in the manner depicted in FIG. 1), although the figure depicts a centered coupling. Segments 220, 222 are free to rotate with respect to one another and may be secured with a locking nut 226. A focusing and correction lens 230, as described in greater detail below, is housed within a retaining cap 232 that is itself fastened to the end of segment 222. Cap 232 includes a window 234 that exposes lens 232, and which has a diameter less than that of segment 222.

Assembly 200 includes pair of interior bores, one inside the other, that define a light path from the end of fiber 10, where laser radiation is emitted, to lens 230. The first of these is defined by a tube 250 joined to the inner face of rear wall 223 opposite sleeve 218, such that the end of fiber 10 protrudes into tube 250 when hood 214 mates with sleeve 218. The end of tube 250 defines a baffle 252 that imposes a fixed radial extent by which emitted radiation can diverge from the central propagated ray, thereby preventing passage of radiation having NA values above a predetermined limit. Baffle 252 has a sharp, flared edge to avoid reflections. In the illustrated embodiment, the edge of baffle 252 is a conicaly flared bezel.

The second bore is defined by the interior walls of segments 220, 222. Low-NA laser radiation emerging from tube 250 passes through the interior of segment 222 and strikes lens 230, which focuses the radiation and corrects for off-center emission (that is, the off-center positions of sleeve 218 and tube 250). Baffle 252 restricts the divergence of radiation sufficiently to avoid reflections from the interior wall of segment 222, and cap 232 forms an aperture stop 234 that restricts the ultimate output to low-NA radiation. Although energy is lost each time radiation is restricted, adjustment of the diameter of aperture stop 234 allows depth-of-focus to be maximized; the diameter can be varied simply by maintaining an inventory of end caps having differently sized apertures and utilizing the aperture most appropriate to the laser that will be employed.

All surfaces of tube 250 and the interior surface of segments 220, 221 are blackened (e.g., with Ebnol "C" black) to prevent reflection.

Figure 8:
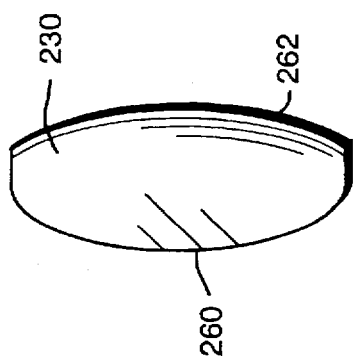
FIG. 8 is a side view of a preferred lens for use with the arrangement depicted in FIG. 7.

Refer now to FIG. 8, which illustrates lens 230 in greater detail. The shape of lens 230 is generally bi-aspheric, i.e., having first and second aspheric surfaces 260, 262. This lens design minimizes the diameter of the image of an off-axis point source by eliminating aberrations and balancing residual aberrations for the field point in question.

In use, the assembly 200 is typically mounted in a writing array containing multiple such assemblies at evenly spaced intervals. A controller causes relative movement between the writing array and printing member 205, effectively scanning the lasers over the surface, and activates them at positions adjacent selected points or areas of the plate. The controller indexes the writing array, after completion of each pass across or along the printing member, a distance determined by the number of beams emanating from the array and by the desired resolution (i.e, the number of image points per unit length). The pattern of laser activation is determined by image signals, provided to the controller and corresponding to the original document or picture being copied onto the plate, to produce a precise negative or positive image of that original. The image signals are stored as a bitmap data file on a computer. Such files may be generated by a raster image processor (RIP) or other suitable means. For example, a RIP can accept input data in page-description language, which defines all of the features required to be transferred onto the printing plate, or as a combination of page-description language and one or more image data files. The bitmaps are constructed to define the hue of the color as well as screen frequencies and angles.

The position of each assembly 200 is adjusted within the writing array such that they all focus at a common distance from the array, i.e., the distance to the imaging layer within printing member 205. The laser associated with each focusing assembly is test fired, and the resulting image dot located to determine the amount by which the assembly is displaced from perfect adjacency. Segment 220 and/or segment 222 is rotated until the horizontal displacement component is eliminated, and nut 226 used to lock the segments into position. Compensation for vertical displacement takes place during imaging by electronically delaying or advancing activation of the associated laser, thereby shifting the longitudinal imaging position at which it applies an image dot.

It will therefore be seen that we have developed an improved and highly advantageous focusing system. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed. For example, the laser source can be attached directly to assembly 200, irradiating directly without transmission through fiber-optic cabling.

What is claimed is:

1. Apparatus for focusing laser output to a preselected spot size, the apparatus comprising;
   a. a housing having an end;
   b. means for directing laser radiation through the housing and toward the end; and
   c. a bi-aspheric lens, disposed at the end, for focusing the radiation beyond the housing.

2. The apparatus of claim 1 further comprising an annular baffle disposed between the first and second ends, the baffle comprising a circular passage having a flared edge.

3. The apparatus of claim 2 wherein the edge is a conically flared bezel.

4. The apparatus of claim 2 wherein the housing comprises a. blackened interior wall.

5. The apparatus of claim 2 further comprising an aperture stop disposed at the end past the lens.

6. The apparatus of claim 1 further comprising:
  a. a diode laser;
  b. a fiber-optic cable for receiving radiation from the diode laser and conducting the radiation to the directing means; and
  c. means for limiting the divergence of radiation emitted from the diode laser before it is received by the cable.

7. Apparatus for focusing laser output to a preselected spot size, the apparatus comprising:
  a. a housing having first and second ends, and a central axis therethrough;
  b. means for directing laser radiation into the housing through the first end, said means being radially offset with respect to the housing axis;
  c. lens means, disposed at the second end, for focusing the radiation and correcting for the radial offset.

8. The apparatus of claim 7 wherein the offset directing means is rotatable about the central axis.

9. The apparatus of claim 7 wherein the lens means is a bi-aspheric lens.

10. The apparatus of claim 7 wherein the housing comprises a blackened interior wall.

11. The apparatus of claim 7 further comprising:
  a. a diode laser;
  b. a fiber-optic cable for receiving radiation from the diode laser and conducting the radiation to the offset directing means; and
  c. means for limiting the divergence of radiation emitted from the diode laser before it is received by the cable.

12. The apparatus of claim 7 further comprising an annular baffle disposed between the first and second ends, the baffle comprising a circular passage having a flared edge.

13. The apparatus of claim 12 wherein the edge is a conically flared bezel.

14. The apparatus of claim 12 further comprising an aperture stop disposed at the end past the lens.

15. Printing apparatus comprising:
  a. means for supporting a laser-imageable printing member;
  b. at least one laser source capable of producing an imaging output through an asymmetric emission aperture, the imaging output dispersing along at least one dimension;
  c. means for conveying the output of the at least one laser source directly to the printing member, said means comprising:
    1) a housing having an end;
    2) means for directing the laser output through the housing and toward the end; and
    3) a bi-aspheric lens, disposed at the end, for focusing the radiation beyond the housing onto the printing member;
  d. means for causing relative movement between the at least one laser source and the printing-member-support means.

16. Printing apparatus comprising:
  a. means for supporting a laser-imageable printing member;
  b. at least one laser source capable of producing an imaging output through an asymmetric emission aperture, the imaging output dispersing along at least one dimension;
  c. means for conveying the output of the at least one laser source directly to the printing member, said means comprising:
    1) a housing having first and second ends, and a central axis therethrough;
    2) means for directing the laser output into the housing through the first end, said means being radially offset with respect to the housing axis; and
    3) lens means, disposed at the second end, for focusing the radiation onto the printing member and correcting for the radial offset;
  d. means for causing relative movement between the at least one laser source and the printing-member-support means.

* * * * *